Nov. 3, 1964  J. H. WHITMORE  3,155,383
PRECISION POSITIONING APPARATUS
Filed Oct. 11, 1962  5 Sheets-Sheet 1
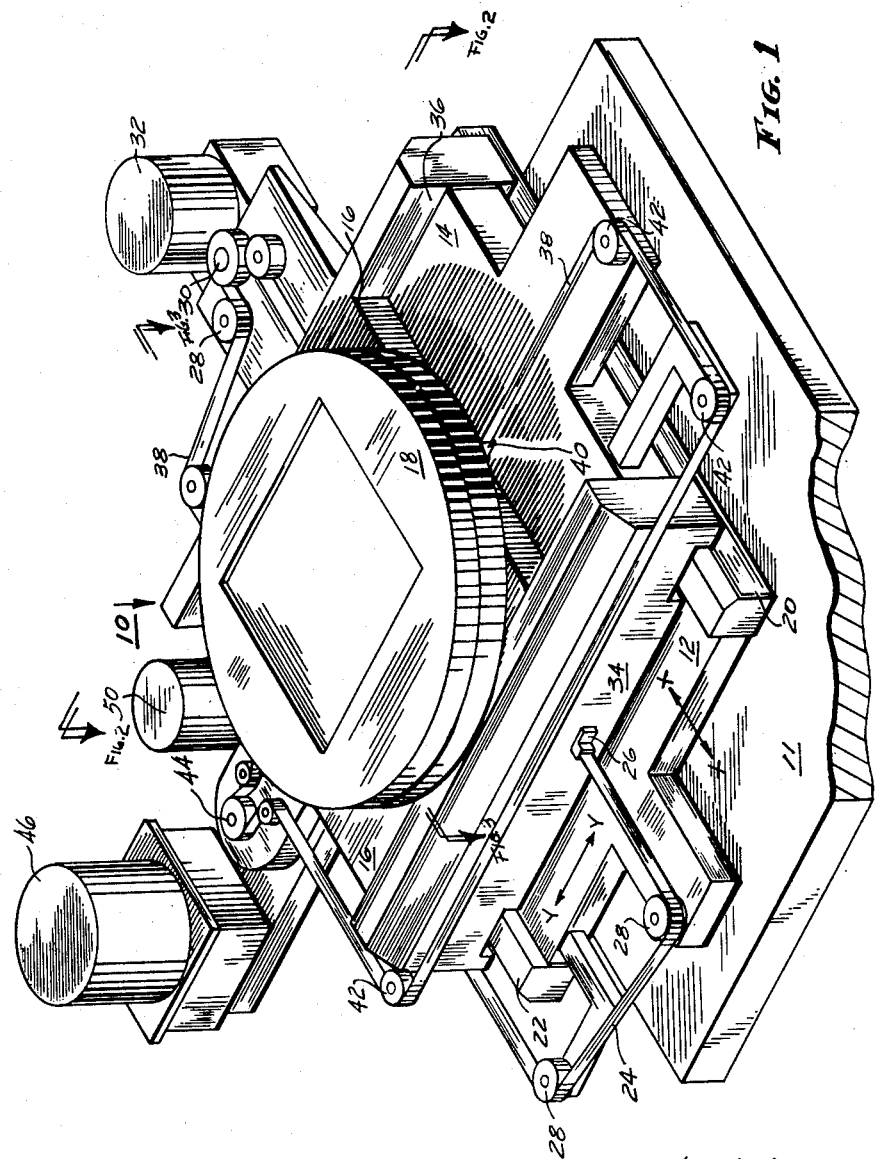
JOHN H. WHITMORE
INVENTOR.
BY
ATTORNEY

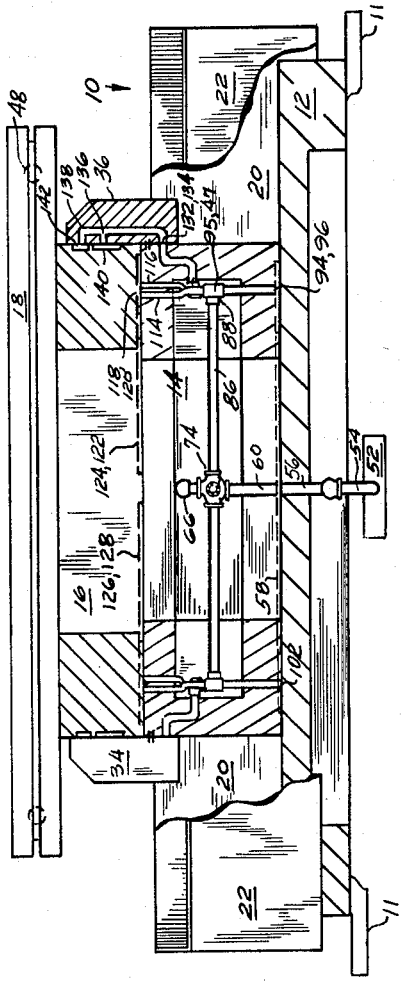

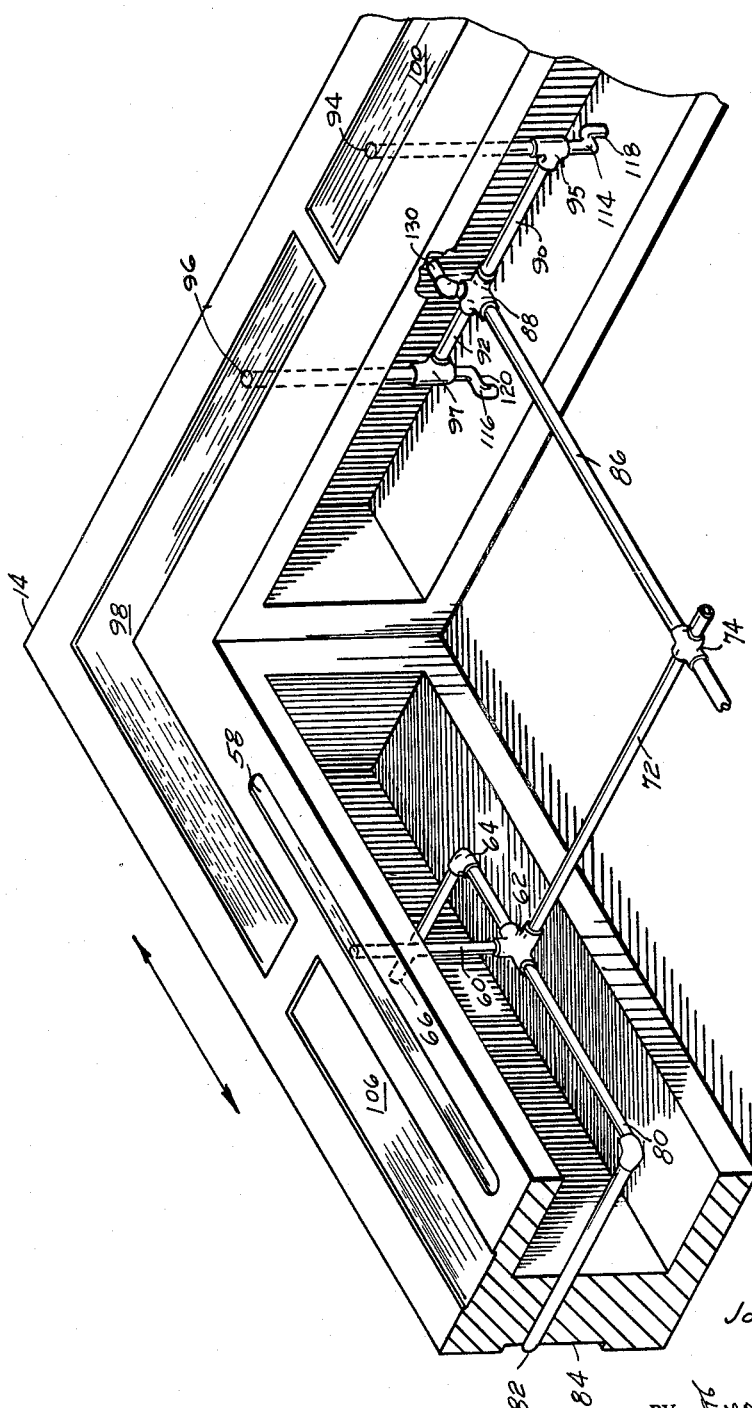

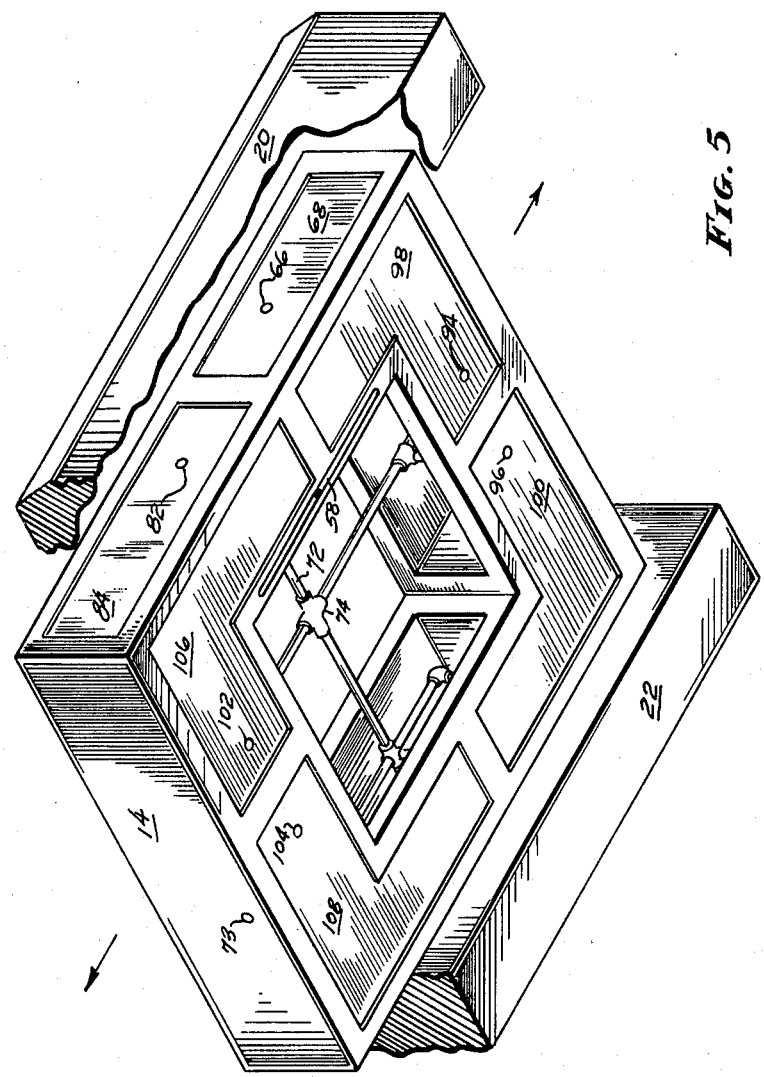

JOHN H. WHITMORE
INVENTOR.

United States Patent Office 3,155,383
Patented Nov. 3, 1964

3,155,383
PRECISION POSITIONING APPARATUS
John H. Whitmore, Binghamton, N.Y., assignor to Link Division of General Precision, Inc., Binghamton, N.Y., a corporation of Delaware
Filed Oct. 11, 1962, Ser. No. 229,962
12 Claims. (Cl. 269—58)

This invention relates to a precision positioning apparatus and more particularly to an improved instrument positioning apparatus which provides rapid and accurate transverse and longitudinal motion with extreme accuracy.

A large number of positioning devices have been developed wherein a work surface is accurately moved with respect to a predetermined reference marker or line. By way of example, in photogrammetry, in order to measure and determine the coordinates of various photographed objects with respect to a base line or index marker, it is generally desired to move a table carrying a photograph so as to position selected objects in the photograph under the reference markers in a stationary viewing system. In order to determine the coordinates of the photographed objects with extreme accuracy, it will be understood that the table conveying the photograph must be moved, positioned, and then maintained in a fixed location with a high degree of precision.

Traditional designs for positioning devices, generally, include a moveable table of sufficient mass to provide the necessary rigidity and dimensional stability. However, the corresponding weight of the moveable table frequently results in frictional forces which interferes with the required accurate positioning. In order to ensure that such a table moves precisely in a desired direction, it usually has been necessary to provide rollers and precision guideways of specially stabilized materials which are carefully selected not only for strength and hardness characteristics but also for compatible thermal coefficients of expansion, all of which tends to increase the frictional forces imposed on the table. Further, note should be made of the fact that when such a table is positioned by a motor or similar device, the presence of static friction maintains the table immobile until the motor drive force at least exceeds the static friction force. In this manner, the precision or accuracy to which the table can be positioned is a function of the amount of static friction present in the system. Although such friction forces may not be of prime importance in certain applications, such friction forces drastically interfere with positioning systems wherein precise and accurate positioning of the table, to any location within the range of the system, is required.

In order to overcome the problems imposed by static friction, such devices as machine tool tables and the like have been designed with fluid bearings. In these devices, a gas, such as air or nitrogen, under pressure, is directed so that the table top is suspended by the gas a minute distance from the base member. Since metal-to-metal contacts are eliminated, static friction forces are markedly reduced. In general, machine tool tables and the like incorporating fluid bearings, employ relatively high fluid pressure, 100 pounds per square inch or greater, to oppose not only the weight of the moveable table but also to resist the large forces applied thereto by cutting tools and the like. Additionally, such tables feature pressures within the bearing cavities or "pads," that is, the volume wherein the fluid pressure itself is effective to maintain separation between the moveable surfaces, at a value sufficient to support the maximum design load together with a safety factor, and as a result the cavity pressure is about 75% of the supply pressure. Further, the conduits or passageways which couple the fluid supply to the cavities exhibit as small an inner diameter, consistent with the table requirements, as possible, in order to minimize the amount of fluid expended. That is, high pressure-low volume fluid flow is desired. Again, in order to minimize air leakage, the cavities in such load-bearing tables are conventionally designed with either essentially square or circular cross-sections to provide a minimum cavity perimeter for the required pad area.

According to the invention, however, there is provided an improved precision positioning apparatus which also incorporates fluid bearings as a means to eliminate static friction. Further, the apparatus of the invention includes novel fluid supply means wherein two independent orthogonal motions are provided without the necesstiy of employing flexible conduits or passageways in order to conduct the fluid to the working area. Additionally, as will be understood from the detailed description of a specific embodiment which follows, the fluid bearings which form a portion of this invention differ markedly from the fluid bearings of the prior art. By way of example, relatively low fluid pressures of about 5 to 10 pounds per square inch are utilized and the cavity pressure is reduced to about 20% or less of the supply pressure. Also, the conduit diameter is relatively large in order to attain an increased volume of fluid flow. Additionally, a novel time constant is determined, which is defined as the ratio between the volume of the cavities and the flow of air therethrough. Finally, note should be made of the fact that the cavity perimeters are basically as large as possible. The combination of the above and other features of the fluid bearings of the invention provide an improved precision positioning apparatus which is automatically self-leveling against eccentric loading, self-cleaning, automatically self-height adjusting, and offers essentially zero static friction.

Briefly, the apparatus of the invention includes a rigid support member and a first table or deck portion adjacent the upper surface thereof. Drive means are provided to impart transverse linear motion to the first table which is separated from the support member by the novel fluid bearings hereinafter described. A second table or deck portion is positioned adjacent the upper surface of the first table and independent drive means are provided for the second table to impart longitudinal motion, with respect to the support member, thereto. Also, the second table is spaced from the first table by additional fluid bearings. In this manner, the work surface, or upper surface of the second table is accurately and precisely positioned to any location within the range of the apparatus.

It is an object of the invention to provide an improved precision positioning apparatus.

Another object of the invention is to provide an improved precision positioning apparatus in which the positioning of the work surface is maintained to a degree of linearity greater than that provided by traditional rollers and precision guide-ways.

A related object of the invention is to provide improved fluid bearings for use in a precision positioning apparatus.

A further object of the invention is to provide a multi-table precision positioning apparatus employing improved fluid bearings between the tables and between the lower table and the support member, wherein the fluid is supplied to all of the bearings without the interposition of hoses, or other flexuous supply means.

Still another object of the invention is to provide a precision position apparatus which provides high precision linear motion in each of two orthogonal directions.

Yet another object of the invention is to provide an improved precision positioning apparatus incorporating a fluid bearing system without the use of O-rings or other sealing devices.

The invention will best be understood from the following description of a specific embodiment thereof taken together with the accompanying drawings in which:

FIG. 1 is a pictorial view of an embodiment of the invention;

FIG. 2 is a cross-sectional side view of the apparatus of FIG. 1, taken along the lines 2—2;

FIG. 3 is a cross-sectional front view of the apparatus of FIG. 1, taken along the lines 3—3;

FIG. 4 is a partial sectional view of a portion of the lower surface of the first table of the apparatus of FIG. 1;

FIG. 5 is a pictorial representation of the first table of the apparatus of FIG. 1.

Figure 6:
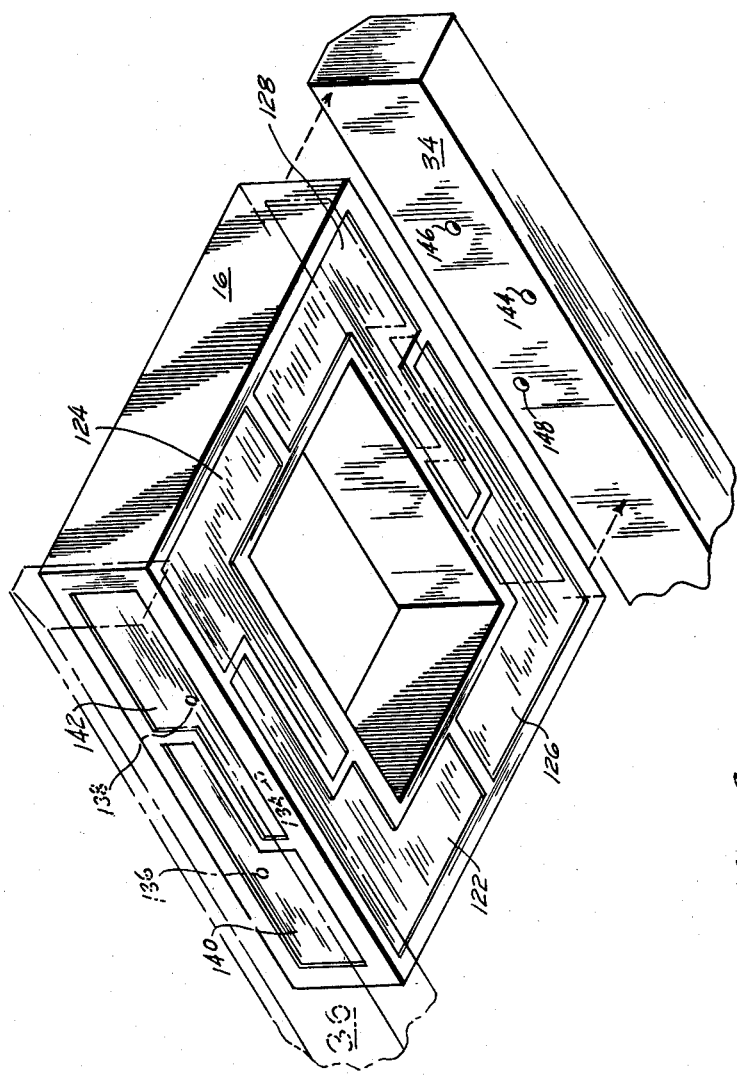
FIG. 6 is a pictorial representation of the second table and the guide-ways therefor of the apparatus of FIG. 1.

Referring now to the drawings, FIG. 1 illustrates one embodiment of the invention. As there shown, a precision positioning apparatus 10 is comprised of three main units, a support member 12, positioned upon a base 11, a first table 14, and a second table 16. Supported upon the upper surface of table 16 is a rotatable circular workpiece holder 18. As will be understood as the description proceeds, table 14 is mounted for translation in the direction indicate by the line X—X, and table 16 is mounted for translation in the direction indicated by the line Y—Y, wherein the line Y—Y is perpendicular to the line X—X. In this manner, any point on a workpiece mounted in holder 18 may be accurately positioned to any location within the range of apparatus 10, as tables 14 and 16 are translated and holder 18 is rotated.

Specifically, support member 12 is provided with a pair of parallel guide-ways 20 and 22 within which table 14 is mounted. Motion is imparted to table 14 through a tape 24, one end of which is attached to table 14 at 26. Tape 24 is passed around several pulleys 28 mounted on support member 12, around a drive capstan 30, the other end of tape 24 being secured to table 14 (not shown). A drive motor 32, also rigidly mounted on member 12, is mechanically linked to drive capstan 30. Operation of motor 32 is thus effective to translate table 12 in the X—X direction.

Table 14 is also provided with a pair of parallel guide-ways 34 and 36 within which table 16 is mounted. Motion is imparted to table 16 in a manner similar to that of table 14. A tape 38, one end of which is attached to table 16 at 40, is passed around several pulleys 42 mounted on table 14, around a drive capstan 44, the other end of tape 38 being secured to table 16 (not shown). A drive motor 46, also rigidly mounted on table 14, is mechanically linked to drive capstan 44. Operation of motor 46 is thus effective to translate table 14 in the Y—Y direction. Workpiece holder 18 is rotatably mounted on table 16 by means of bearings 48 (see FIGS. 2 and 3). A drive motor 50, mounted on table 16, is mechanically linked to holder 18. Operation of motor 50 is thus effective to rotate holder 18.

Although only a single drive system has been illustrated and described, it should be apparent that many other types of drive systems could be employed in the apparatus of the invention, provided only that the drive system does not disturb the straightness of travel achievable with the tables. For this reason, the drive system will neither be described nor illustrated in the further description of the invention in order that other features of the invention will be more clearly understood.

Returning again to the drawings, FIGS 2 and 3 are cross-sectional views of the embodiment of the precision positioning apparatus 10, taken along the lines 2—2 and 3—3, respectively, as indicated in FIG. 1. Support member 12 comprises as essentially rectangular plate portion having sufficient mass to provide rigidity for apparatus 10. Guide-ways 20 and 22 (see FIG. 2) extend along opposite edge portions of support member 12 and are rigidly secured thereto by means of screws, bolts, or the like. In a similar manner guide-ways 34 and 36 (see FIG. 3) are rigidly secured along opposite edge portions of table 14. Note should be made of the fact that it is not necessary to accurately machine the inner surfaces of the guide-ways in order to obtain precision positioning of the workpiece. This results because the fluid film which maintains clearance between the moving tables and the fixed guide-ways acts to average out slight irregularities which are unavoidably present in physically contacting surfaces. This averaging effect is so effective that the apparatus of the invention incorporating guide-ways finished to rough grinding tolerances, exhibits straightness of travel of the workpiece holder in the order of a few microinches.

Fluid for operation of the novel bearings is supplied from a fluid supply source 52 along a conduit 54, which may be rigid or fixed, to an opening 56 in and through support member 12. Positioned above opening 56 is a longitudinal slot 58 in the lower surface of table 14, which extends along the X—X direction a major portion of the length of table 14. Slot 58 is nominally several ten thousandths of an inch in depth and is effectively sealed by support member 12. In this manner fluid is delivered to table 14 independent of its position relative to support member 12. From slot 58 fluid is supplied to the vertical bearings of table 14 which maintain separation between table 14 and support member 12, to the horizontal bearings of table 14 which maintain separation between table 14 and guide-ways 20 and 22, to the vertical bearings of table 16 which maintain separation between tables 14 and 16, and to openings in guide-ways 34 and 36 to thereafter supply fluid to the horizontal bearings of table 16 to maintain separation between table 16 and guide-ways 34 and 36. Each of these elements is coupled to slot 58 by means of internal rigid conduits located within table 14 and guide-ways 34 and 36. In this manner, fluid is supplied to all of the bearings of tables 14 and 16, wherein each of the tables are independently mobile, without the use of flexible hoses or the like which would tend to skew the table motion as a result of the frictional drag imparted thereby.

In the following description of the rigid fluid conduits of the apparatus of the invention, which provide for the elimination of all flexible hoses, reference should also be had to FIGS. 4, 5, and 6, as necessary, which are an expanded partial sectional view of table 14, and a pictorial representation of table 14 and 16, respectively. Extending from slot 58 is a first conduit 60 which terminates in a multiple T junction 62. A further conduit 64 is coupled to junction 62 and terminates in an orifice 66 located in cavity 68, (see FIGS. 2 and 5). Cavity 68 together with guide-way 20 forms a first horizontal bearing for table 14, the specific design requirements thereof being hereinafter more completely described. Another horizontal bearing for table 14 is formed by cavity 70 and guide-way 22. (See FIG. 2) Fluid is supplied to cavity 70 by means of a conduit 72, coupled to junction 62, a T junction 74, and an orifice 76. A further pair of horizontal bearing pads for table 14, 84 and 86, are also supplied with fluid in a similar manner. Again, coupled to junction 62 is yet another conduit 80 terminating in orifice 82 within pad 84 (see FIG. 5). Additionally, pads 84 and 86 are likewise supplied with fluid from junction 74.

Continuing, fluid is supplied to the vertical bearings of table 14 from junction 74. A conduit 86, coupled thereto, is connected to another T junction 88, and a pair of conduits 90 and 92 coupled to junction 88 terminate in orifices 94 and 96, respectively, by means of a pair of intermediate T junctions 95 and 97, thereby supplying fluid to vertical bearing pads 98 and 100. Again, in a similar manner, further conduits coupled to junction 74 terminate in orifices 102 and 104 (see FIG. 5) to supply vertical bearing pads 106 and 108 with the necessary fluid. It should now be understood that each of the four horizontal and each of the four vertical fluid bearings of table 14 are continuously supplied with the necessary fluid pressure by rigid conduit means self-contained within table 14 itself, and this fluid supply means is effective independent of the position of table 14 with respect to support member 12 as a result of the action of slot 58 of table 14 cooperating with conduit 56 of support member 12.

The bearings of table 16, the motion of which is independent of support member 12 and table 14, are supplied with fluid by means external of table 16. Referring again now to FIG. 4, from junctions 95 and 97, still another pair of conduits, 114 and 116, coupled thereto, supply fluid to a pair of orifices 118 and 120 in the upper surface of table 14. These orifices, which of course are concealed in FIG. 1, are positioned so that they are effective to supply fluid to vertical bearings 122 and 124 of table 16 (see FIG. 6). Note should be made of the fact that the parallel overlapping arrangement of bearings 122 and 124 provides for maximum motion of table 16 with respect to table 14 yet maintaining continuous fluid supply to bearings 122 and 124. It should also be understood that the remaining pair of vertical bearings of table 16, that is bearings 126 and 128, are likewise supplied with fluid from a pair of orifices positioned in the upper surface of table 14.

In order to supply fluid to the horizontal bearings of table 16 a further novel means is provided in order to eliminate the necessity of flexible hoses or the like. Referring once more to FIG. 4, yet another conduit 130 is coupled to junction 88 which terminates in an orifice 132 positioned in the side wall of table 14 (see FIG. 3). As hereinabove noted, guide-way 36 is rigidly secured to table 14, and, referring now to FIG. 6, positioned in guide-way 36 is an orifice 134 which is located contiguous with orifice 132 of table 14 to thereby conduct fluid from table 14 into and through guide-way 36. An internal conduit in guide-way 36 couples fluid from orifice 134 to a pair of orifices 136 and 138 thereby supplying fluid to horizontal bearings 140 and 142 of table 16. In a similar manner the remaining pair of horizontal bearings are supplied with fluid by means of a pair of orifices in guide-way 34. In summary then, it should now be understood that fluid is supplied to the horizontal and vertical bearings of table 14 by means of rigid conduits located within table 14 itself, and fluid is supplied to the bearings of table 16 by means external to table 16, the vertical bearings being supplied by orifices in table 14 and the horizontal bearings by orifices in guide ways 34 and 36. Note should also be made of the fact that fluid is also supplied internally to table 14 again by rigidly positioned conduits and a lengthwise slot. Important to note is the fact that all flexible fluid couplings and the like have been completely eliminated by the novel fluid supply means in order to prevent any skew of frictional drag to be developed by such couplings yet maintaining the advantages afforded by fluid bearings in a precision positioning apparatus which exhibits two independent directions of motion for the work piece.

Further, although the generic term fluid has been employed throughout the above description of one embodiment of the invention to indicate that a liquid or gas is useful in the operation of the apparatus of the invention, it will be apparent to those skilled in the art that air is generally preferred. In the following specific description of the bearings of the invention it will be understood that air is so employed unless otherwise indicated.

Generally, fluid bearings, according to the prior art, include design characteristics particularly adapted for use in sustaining relatively heavy loads, and several of these characteristics are far from optimum in the design of fluid bearings for use in a precision positioning apparatus. Specifically, the periphery, B, of the bearing cavity, or pad, is generally minimized in order to lessen the leakage of the supplied fluid, while the area of the cavity is maximized in order to generate large lifting forces from the available fluid supply pressure. Thus, the load carrying fluid bearings of the prior art, while capable of supporting heavy loads with as little friction as possible, are severely lacking in the advantageous averaging effect provided by the fluid bearings of this invention. Averaging effect, as used in this specification is defined in terms of the improvement provided by the novel fluid bearings wherein the maximum linearity of travel of a table supported above a base is considerably greater than the linearity of the guide-ways within which it rides. It has been determined that optimum averaging effect is obtained when the cavity periphery, B, to cavity area, A, ratio, that is $B/A$, is within the range 1.2:1 to 1.5:1. It is obvious to those skilled in the art, that this referred $B/A$ ratio results in a considerably greater rate of fluid leakage than would be tolerable in the heavy load bearings of the prior art. Additionally, several additional parameters must also be properly selected in order to obtain optimum performance of the precision positioning apparatus of the invention. Thus, the ratio of the area of the vertical bearing pads to the overall traveled surface is about 1:8 and the ratio of the area of the horizontal bearing pads to the overall traveled surface is about 1:3. Further, the ratio of pad volume to the rate of fluid flow per second is at least 10:1. Continuing, in order to supply the inherently high rate of leakage as determined by the pad design, the fluid supply conduits must be of significantly greater diameter than that which has generally been employed in prior art. The larger diameter conduits result, therefore, in a higher degree of coupling between the fluid supply means and the cavities supplied thereby. Again, for increased stability the pressure difference between the fluid supply means and the pad is relatively large in order to maintain sufficient reserve pressure for additional lift, while the pressure difference between the pad and the volume exhausted into, which normally is atmospheric, is relatively small.

A typical table incorporating the above design features carries 10 pounds of load with a system air pressure of below 2 oz. gauge and with flow rates well below 1 cubic inch per second. The same table is capable, at approximately 10 p.s.i. gauge pressure, of supporting 250 pounds with a table area dimension of 10 by 10 inches. Actual tests on such a table indicate deviations from straight line travel of as little as ±0.1 microns over a range of ten inches. Additionally, the table is extremely resistant to eccentric loading and does not require close tolerance machining. Separation of the table from the support and guide-ways is generally less than 0.0005 inch. This small separation distance combined with the selectively small pressure drop between the pad and exhaust volumes results, essentially, in a large amount of effective negative feedback stability being present in the system, such that when the system tends to tilt as a result of eccentric loading or other impulses; the restoring spring constant of the fluid film automatically ensures an extremely high restoring and damping coefficient. The restoring time constant, which is determined by the ratio of pad volume to the rate of fluid flow, is approximately 0.1 second or less for a table designed according to the parameters listed above.

Note should be made of the fact that the precision positioning apparatus of the invention provides extremely linear and accurate motion in each of two orthogonal directions, and in order to precisely determine the actual longitudinal positioning of each table to within one micron or less, it is necessary to provide an additional precision position measuring device such as an interferometer or the like. However, such devices are well known to those skilled in the art and will not further be described in this specification.

Finally, note should also be made of the fact that problems of wear in the guide-ways are essentially ended by the elimination of direct physical contact with the guide-ways. The clearance is maintained, as will be understood by those skilled in the art, both during translation of the table and also when the table is at rest as a result of the novel fluid bearings. This application is related to the invention disclosed and claimed in copending application Serial No. 229,802, filed October 11, 1962, for Precision Positioning Apparatus on behalf of Jaromir K. Sazavsky and assigned to the assignee of this invention.

While the invention has been shown and described with respect to a single embodiment, it will be understood that various changes and modifications may be made therein without departing from the spirit of the invention, and it is intended therefore only to be limited by the scope of the following claims.

What is claimed is:

1. A precision positioning apparatus comprising,
   (a) first and second tables and a support member;
   (b) means positioning said first table on said support member and said second table on said first table;
   (c) first and second drive means, said first drive means effective to translate said first table transversely with respect to said support member and said second drive means effective to translate said second table longitudinally with respect to said support member; and
   (d) means decreasing frictional forces when said first and second tables are driven by said first and second drive means;
   (e) said last named means including a plurality of fluid bearings on the lower surface of each of said first and second tables, a supply of pressurized fluid, and rigid supply means coupling said fluid to all of said plurality of bearings, whereby said first table tends to separate from said support member and said second table tends to separate from said first table.

2. A precision positioning apparatus comprising,
   (a) first and second tables and a support member;
   (b) means positioning said first table adjacent an upper surface of said support member;
   (c) first drive means for moving said first table transversely with respect to said support member;
   (d) means positioning said second table adjacent an upper surface of said first table;
   (e) second drive means for moving said second table longitudinally with respect to said support member;
   (f) each of said first and second tables including a plurality of fluid bearings on a lower surface thereof; and
   (g) means maintaining said second table spaced from said first table and said first table spaced from said support member;
   (h) said last named means including fluid supply means, said fluid being pressurized, and means rigidly coupling said supply means to each of said plurality of bearings.

3. The apparatus of claim 2 wherein said fluid is air.

4. A precision positioning apparatus comprising,
   (a) first and second tables and a support member;
   (b) first positioning means including a first pair of parallel guide-ways for locating said first table adjacent an upper surface of said support member, said first pair of guide-ways being secured to said support member;
   (c) first drive means for moving said first table transversely with respect to said support member;
   (d) second positioning means including a second pair of parallel guide-ways for locating said second table adjacent an upper surface of said first table, said second pair of guide-ways being secured to said first table;
   (e) second drive means for moving said second table longitudinally with respect to said support member;
   (f) each of said first and second tables including a plurality of horizontal and vertical fluid bearings to reduce the frictional drag thereof;
   (g) a source of pressurized fluid; and
   (h) means rigidly coupling said source to all of said plurality of horizontal and vertical bearings.

5. The apparatus of claim 4 wherein said last named means includes,
   (a) a fluid channel, one end of which is coupled to said source and the other end of which terminates in an orifice in said upper surface of said support member;
   (b) a slot in a lower surface of said first table extending transversely with respect to said support member and in vertical alignment with said orifice in said upper surface thereof;
   (c) a first plurality of rigid conduits for coupling fluid from said slot to all of said plurality of horizontal and vertical bearings of said first table, all of said first plurality of conduits being positioned internal of said first table;
   (d) a second plurality of rigid conduits connected to a portion of said first plurality of conduits and terminating in a plurality of orifices in said upper surface of said first table for supplying fluid to all of said plurality of vertical bearings of said second table, all of said second plurality of conduits being positioned internal of said first table;
   (e) a third plurality of rigid conduits connected to a portion of said first plurality of conduits and terminating in a second plurality of orifices positioned in opposite side surfaces of said first table adjacent said second pair of guide-ways; all of said third plurality of conduits being positioned internal of said first table;
   (f) a third plurality of orifices positioned in said second pair of guide-ways contiguous with said second plurality of orifices; and
   (g) a fourth plurality of rigid conduits coupling fluid from said third plurality of orifices to all of said plurality of horizontal bearings of said second table, said fourth plurality of conduits being positioned internal said second pair of guide-ways.

6. A precision positioning apparatus comprising,
   (a) first and second tables and a support member;
   (b) means positioning said tables and said support member in parallel vertical planes with said first table intermediate said support member and said second table;
   (c) first and second independent drive means for said first and second tables, respectively, for translating said tables orthogonally one to another;
   (d) each of said first and second tables including a plurality of fluid bearings to reduce the frictional drag thereof;
   (e) a source of pressurized fluid; and
   (f) means rigidly coupling said source to all of said plurality of bearings, said rigid means being located internal of said first table and external of said second table.

7. The apparatus of claim 6 wherein adjacent fluid bearings of said second table overlap throughout a portion of their respective lengths.

8. A precision positioning apparatus comprising,
   (a) a work surface;
   (b) drive means for accurately and precisely positioning said work surface to any location within the range of said apparatus, said drive means including a plurality of air bearings;
   (c) a source of pressurized air; and
   (d) rigid means coupling said source to all of said plurality of bearings.

9. A precision positioning apparatus comprising,
   (a) a work surface;
   (b) drive means for accurately and precisely positioning said work surface at selected orthogonally determined locations in a horizontal plane defined by the upper planar area of said surface, said drive means further including a plurality of fluid bearings;

(c) a source of pressurized fluid; and (d) rigid coupling means connecting said source to all of said plurality of bearings whereby the absence of flexuous connections permits an increase in the linearity of travel of said surface.

10. A precision positioning apparatus comprising, (a) first and second tables and a support member;

(b) means positioning said first table on said support member and said second table on said first table;

(c) first and second drive means, said first drive means effective to linearly translate said first table transversely with respect to said support member without any longitudinal motion and said second drive means effective to translate said second table longitudinally with respect to said support member without any transverse motion; and (d) means decreasing cohering forces when either of said first and second tables are driven by said first and second drive means;

(e) said last named means including a plurality of fluid bearings located on selected outer surfaces of each of said first and second tables, a source of pressurized fluid, and rigid supply means positioned within and about said first and second tables and said support member coupling fluid from said source to all of said plurality of fluid bearings.

11. A precision positioning apparatus comprising, (a) a work surface and a support member;

(b) means positioning said work surface in spaced relationship with said support member;

(c) drive means for accurately and precisely positioning said work surface to any location within the range of said apparatus determined by said support member, said drive means being selectively operative in mutually perpendicular directions;

(d) said work surface and said support member further including a plurality of fluid bearings;

(e) a source of pressurized fluid; and (f) rigid coupling means connecting said source to all of said plurality of fluid bearings.

12. The apparatus of claim 11 wherein said support member includes slot means engaging said source and said rigid coupling means.

References Cited in the file of this patent

UNITED STATES PATENTS

| | | |
|---|---|---|
| 2,384,809 | Bullard et al. | Sept. 18, 1945 |
| 2,493,827 | Parsons | Jan. 10, 1950 |
| 2,500,933 | Dailey | Mar. 21, 1950 |
| 2,561,346 | De Vlieg et al. | July 24, 1951 |
| 2,788,862 | Langer | Apr. 16, 1957 |
| 2,837,707 | Stokes | June 3, 1958 |
| 2,869,933 | Bissinger | Jan. 20, 1959 |
| 2,902,607 | Hedger et al. | Sept. 1, 1959 |
| 2,942,385 | Pal | June 28, 1960 |
| 3,026,150 | Buckley et al. | Mar. 20, 1962 |
| 3,070,406 | McKenney | Dec. 25, 1962 |
| 3,070,407 | Hughes | Dec. 26, 1962 |
| 3,083,580 | Carson et al. | Apr. 2, 1963 |